United States Patent
Lo

(10) Patent No.: US 7,155,039 B1
(45) Date of Patent: Dec. 26, 2006

(54) AUTOMATIC FINGERPRINT IDENTIFICATION SYSTEM AND METHOD

(75) Inventor: Peter Zhen-Ping Lo, Lake Forest, CA (US)

(73) Assignee: Motorola, Inc., Schaumburg, IL (US)

( * ) Notice: Subject to any disclaimer, the term of this patent is extended or adjusted under 35 U.S.C. 154(b) by 686 days.

(21) Appl. No.: 10/323,406

(22) Filed: Dec. 18, 2002

(51) Int. Cl.
*G06K 9/00* (2006.01)

(52) U.S. Cl. ...................................... 382/124
(58) Field of Classification Search ................ 382/124
See application file for complete search history.

(56) References Cited

U.S. PATENT DOCUMENTS

| | | | |
|---|---|---|---|
| 3,699,519 A | 10/1972 | Campbell | |
| 4,225,850 A | 9/1980 | Chang et al. | |
| 4,646,352 A | 2/1987 | Asai et al. | |
| 4,817,183 A | 3/1989 | Sparrow | |
| 4,876,726 A | 10/1989 | Capello et al. | |
| 5,548,394 A | 8/1996 | Giles et al. | |
| 5,613,014 A | 3/1997 | Eshera et al. | |
| 5,625,448 A | 4/1997 | Ranalli et al. | |
| 5,659,626 A | 8/1997 | Ort et al. | |
| 5,869,822 A | 2/1999 | Meadows, II et al. | |
| 5,926,555 A * | 7/1999 | Ort et al. | 382/124 |
| 5,960,101 A * | 9/1999 | Lo et al. | 382/125 |
| 6,021,211 A | 2/2000 | Setlak et al. | |
| 6,047,079 A | 4/2000 | Uchida | |
| 6,314,196 B1 * | 11/2001 | Yamaguchi et al. | 382/125 |
| 2002/0154793 A1 * | 10/2002 | Hillhouse et al. | 382/115 |
| 2003/0091724 A1 * | 5/2003 | Mizoguchi | 427/1 |

* cited by examiner

*Primary Examiner*—Joseph Mancuso
*Assistant Examiner*—Jonathan Schaffer
(74) *Attorney, Agent, or Firm*—Douglas W. Gilmore; Valerie M. Davis

(57) ABSTRACT

A system and method for automated print identification is described. In particular, the method includes providing an active search record, arranging the prints of the active search record according to print quality to generate a filtered active file database, providing the filtered active file database as the input to a match algorithm, detecting a print correlation corresponding to a print contained in the active file database, determining if a print match has been made, determining the strength of a match if a print match has been made, and determining the active search file record to be added into the active database or the matched active file records to be updated.

22 Claims, 2 Drawing Sheets

AUTOMATIC FINGERPRINT IDENTIFICATION SYSTEM AND METHOD

FIELD OF INVENTION

This invention relates generally to automatic fingerprint identification systems, and more particularly to a system and method of enrolling prints into a database for quick and accurate matching with other prints.

BACKGROUND

Identification pattern systems, such as tenprint or fingerprint identification systems, play a critical role in modern society in both criminal and civil applications. For example, criminal identification in public safety sectors is an integral part of any present day investigation. Similarly in civil applications such as credit card or personal identity fraud, print identification has become an essential part of the security process.

An automatic fingerprint identification operation normally consists of two stages. The first is the registration stage and the second is the identification stage. In the registration stage, the register's prints and personal information are enrolled and features, such as minutiae, are extracted. The personal information and the extracted features are then used to form a file record that is saved into a database for subsequent print identification. Present day automatic fingerprint identification systems may contain several hundred thousand to many millions of such file records.

In the identification stage, print features from an individual, or latent print, and personal information are extracted to form what is typically referred to as a search record. The search record is then compared with the enrolled file records in the database of the fingerprint matching system. In a typical search scenario, a search record may be compared against millions of file records that are stored in the database and a list of matched scores are generated after the matching process. Candidate records are sorted according to matched prints scores. A matched score is a measurement of the similarity of the print features of the identified search and file records. The higher the score is, the more similar the file and search records are determined to be. Thus, a top candidate is the one that has the closest match.

However, it is well known from verification tests that the top candidate may not always be the correctly matched record because the obtained prints may vary widely in quality. Smudges, individual differences in technique of the personnel who obtain the prints, equipment quality, and environmental factors may all affect print quality. To ensure higher accuracy in determining the correctly matched candidate, the search record and the top n file records from the sorted list are provided to an examiner for manual review and inspection. Once a true match is found, the identification information is provided to a user and the search print is discarded from the identification system or added to the file database according to the system requirement. If a true match is not found, a new record is created and the personal information and print features of the search record are added to the file database.

Many solutions have been proposed to improve the accuracy of matched scores and to reduce the workload of manual examiners. Most of these proposals, to date, have focused on designing improved fingerprint scanners to obtain better quality print records. Other proposals include designing a better fingerprint enhancement process and feature extraction algorithm to obtain better matching features, and designing improved matching algorithms such as the expert matcher described in U.S. Pat. No. 5,960,101. In short, more effort has been directed to improving the individual components of automatic fingerprint identification systems, and attention has been paid to developing a process to build an integrated and robust database. Thus, a system that contains poor quality search and/or file records can only provide correspondingly poor match results that may not even provide a match, even though the mated record is known to be in the database and the components of the AFIS system are improved.

Additional disadvantages of previous AFIS systems include lack of clear feedback loops between processing blocks to provide self-healing of the systems so that as time passes more searches are performed. For example the image quality measurements are normally only utilized locally to reject or accept a fingerprint. The quality measurements are not used in the matching process. The quality measurements derived are optimized with respect to using manual manipulation of the print, and are not directly optimized based on overall matching results. Previous matched results and image quality measurements are not utilized to improve future search; the number of fingers used for the match comparison is not dynamically selected based on quality of the prints; and the integrity check of prints during the registration step is not fully automated.

Thus, it would be desirable to have an improved automatic fingerprint identification system and a method that address the disadvantages enumerated above to achieve substantially increased accuracy without sacrificing speed in the identification process.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Figure 1:
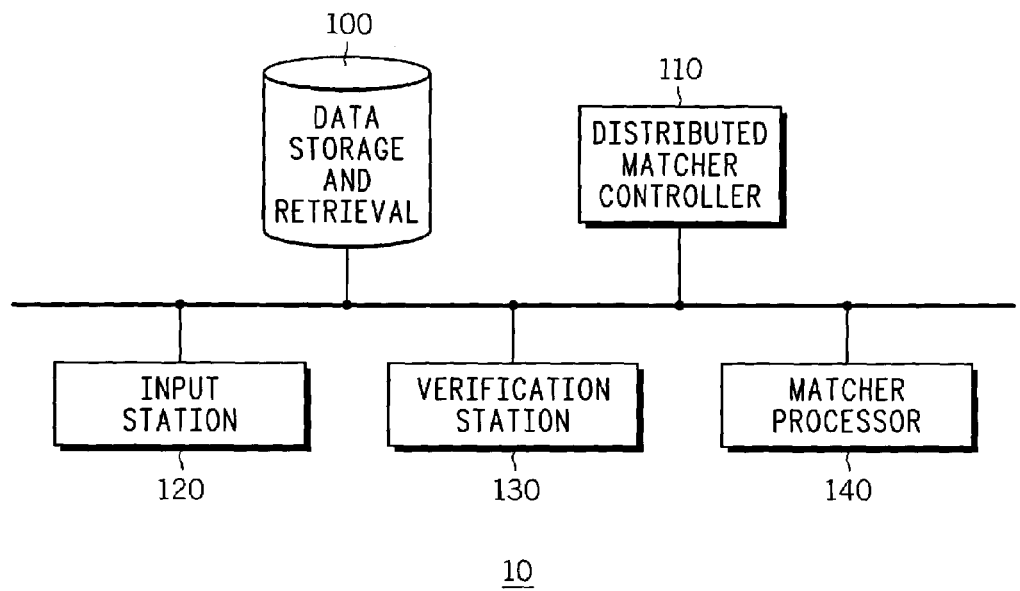
FIG. 1 is a schematic drawing of a hardware system including the fingerprint identification system in accordance with the present invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

It will be appreciated that for simplicity and clarity of illustration, elements shown in the figures have not necessarily been drawn to scale. For example, the dimensions of some of the elements are exaggerated relative to each other.

Further, where considered appropriate, reference numerals have been repeated among the figures to indicate corresponding elements.

FIG. 1 illustrates an automatic fingerprint identification system (AFIS) 10 that may be used to incorporate the system of the invention and is described in more detail in U.S. Pat. No. 5,960,101. The system 10 includes a data storage and retrieval system 100 that stores and retrieves features of print images, including fingerprints and palm prints. The AFIS system 10 may optionally include a number of workstations, such as an input station 120. The input station may further be connected with flat-bed scanners, ten-print live scanners and digital cameras. The scanners or cameras are used to scan prints or capture latent prints that may be loaded into a microprocessor. The loaded prints are segmented and quality is assigned to each print. The prints are further enhanced and processed. The matching features are also extracted. In a preferred embodiment some of the prints of the invention will be loaded into the microprocessor. The matching features are sent to a distributed matcher controller 110. Based on the matching features, the filtered file database is loaded from the data storage and retrieval system 100 and distributed to minutiae matchers 140 to perform an initial matching of search and file records. The matching results are transmitted back to the distributed matcher controller 110 for analysis. If no match is found, a detail matching may be preformed with expert matchers in 140 and the results are sent back to the distributed matcher controller 110 for further analysis. In a preferred embodiment some of the invention is implemented in the distributed matcher controller and loaded in a microprocessor. These processes may be based on any one of a number of available computer systems, such as a personal computer or Unix computer system manufactured by Hewlett Packard, Compaq Corporation, etc. The system may also be linked to a verification station 130 that is used to verify the matching results. The above systems are well known in the art and currently available from Printrak International, a Motorola company.

The records search and file may be processed from unsolved latent prints, ten prints, a set of finger prints, slap prints, palm prints, etc. An unsolved latent print is typically defined as a finger or palm print lifted from a crime scene or unknown source whose owner is unknown. A ten print or set of fingerprints generally means a set of 10 or less fingerprints that may have been taken from a person by either the rolled or flat method of capturing the prints in a medium. A slap print is the literal slapping of the user's inked hands onto a medium or the literal slapping of the user's hands onto a fingerprint capture sensor. Typically, the unknown prints are processed to produce a search record that is compared against file records processed from a number of known subjects. It is understood that file records may include toe or palm prints as well and may be referred to as "reference records" in a tenprint/latent to tenprint database search since the search record is unknown or the identity of the search needs to be verified.

Each print provides a record of data including a classification of each print as one of four major print types: arch, left loop, right loop, and whorl; as well as minutiae which have respective X-Y coordinate positions and angles of orientation as described in detail in U.S. Pat. No. 5,960,101 and U.S. Pat. No. 5,548,394.

Individual extracted minutiae of each print form what is termed a "search record." A search record may be referred to as a "reference print" as well in a tenprint to unknown latent database search.

Figure 2:
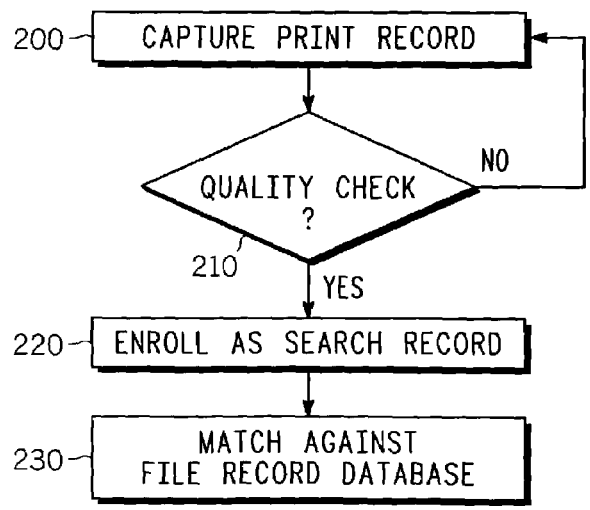
FIG. 2 is a flow diagram illustrating a matched print record system.

In step 210 the captured print records are checked for quality as is known in the art. If the prints are deemed of sufficient quality they are enrolled as search records in the data storage and retrieval portion 220 of the system. If the prints are not of sufficient quality, the records are recaptured from the user as illustrated in step 200 of FIG. 2. The search record deemed of sufficient quality are matched with file records retrieved from the database using a matching algorithm loaded on multi micro-processors which are controlled by the distributed matcher controller 110. The matched results are sent back to the distributed matcher controller 110 for analysis.

Figure 3:
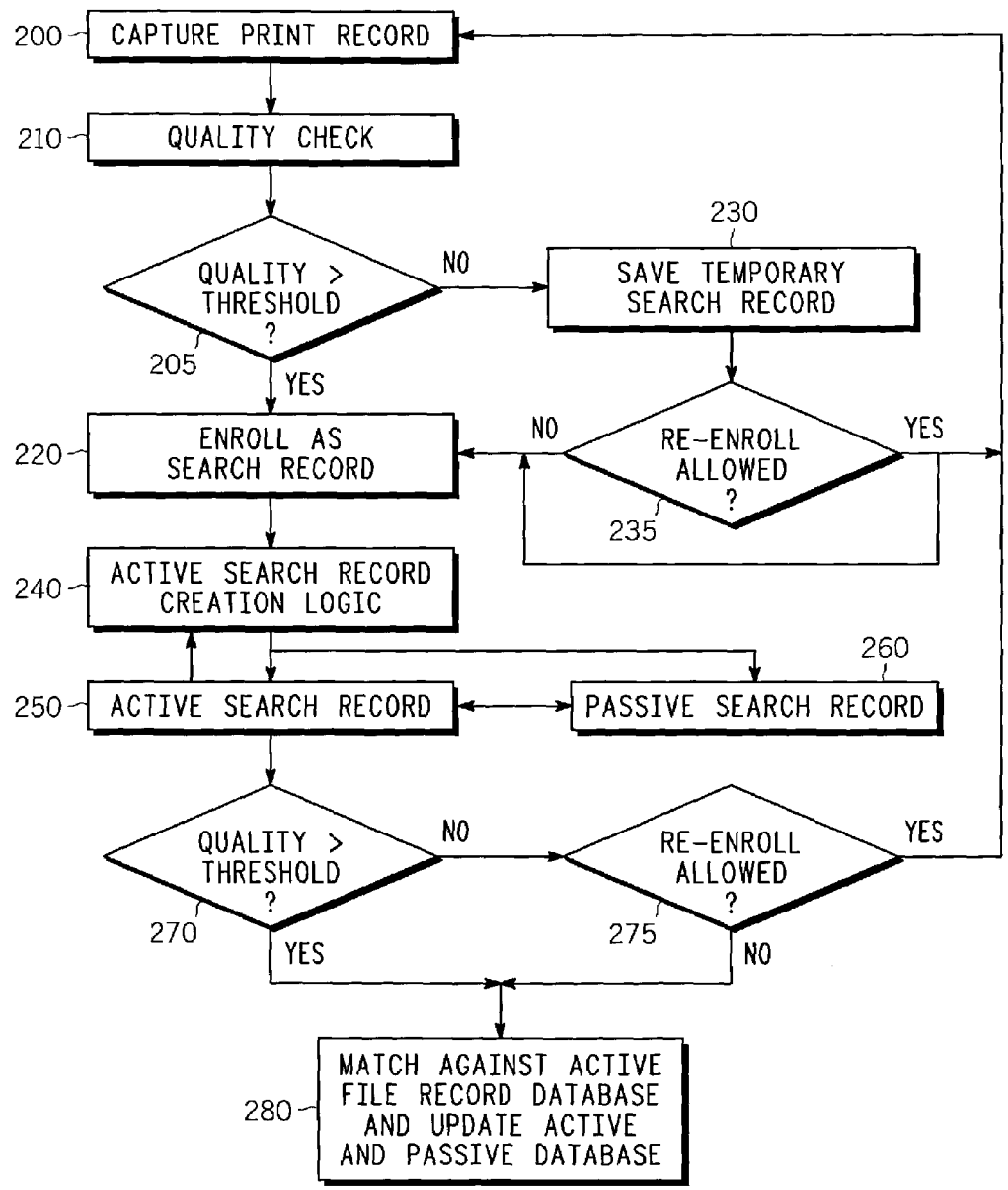
FIG. 3 is a flow diagram illustrating the improved matched system in accordance with the present invention.

In FIG. 3, the present invention is illustrated as followed. Prints are captured from a person or source, including preferably ten prints and slap prints, in step 200 as described above. The captured print records are reviewed for quality in step 210 using a quality algorithm, such as a preferred ICCS algorithm as described later. Prints that exhibit a predetermined threshold quality (step 205) are enrolled in the database as search records in step 220. The search record in step 220 is reorganized using a method as described below to generate an active search record 250 and a passive search record 260. The active search record 250 and the passive search record 260 resulting from the active search record creation in step 240 are used as a possible search record and subsequently matched against active file records from an active database in step 280.

The minutiae of the search and file records are compared in a minutiae match microprocessors in 140 of FIG. 1. In particular, print types, the X-Y coordinates and the angles of orientation of minutiae in the search and file records are compared to determine which prints are possible matches, and match scores are sent back to 110 of FIG. 1 to downselect possible matching prints for further evaluation using logic such as an IDL logic-1 as described in U.S. Ser. No. 60/415,065 filed Sep. 30, 2002. If true hits (after verification) are found from the matcher in 110 of FIG. 1, the matched active file records are modified according to a preferred method described in later section. If no possible match is found in 110, the top matching candidates are sent to 140 where a refined matching process using an Expert Matcher as described in U.S. Pat. No. 5,960,101 is used. The matched results are sent back to 110 for further evaluation using logic such as a IDL logic-2 as described in U.S. Ser. No. 60/415,065 filed Sep. 30, 2002. If true hits (after verification) are found from the matcher, the matched active file records are modified according to a preferred method described in a later section. If no match is found, two results from the minutiae matcher and expert matcher will be combined to promote or demote any week possible hit using a logic such as IDL logic 3 in U.S. Ser. No. 60/415,065 filed Sep. 30, 2002. The weak hits from the logic 3 are evaluated by an examiner. If the true hits resulted from human verification, the matched active file records are modified according to a preferred method described in later section. Otherwise the active search record is saved/added into the active file record database and passive file record is saved/added into the passive file record database. A link between the active file record and the passive file record is established by a link list. This all happens in the step 280.

A minutia on a search record is termed as "mated" if there is corresponding minutia on the file record, or if there is a corresponding minutia that falls on or near the minutia on the file record. Other known print matching techniques may also be used in which the focus is on matching a file record is individual minutiae, as well as features in the immediate vicinity of the file record individual minutiae, with corresponding search record individual minutiae, as well as features in the immediate vicinity of the individual print minutiae as described in U.S. Pat. No. 5,960,101.

If the print record does not meet the predetermined card quality threshold in step 205, the print record is saved as a temporary search record in step 230 of the invention. If the re-enrollment is not allowed, the temporary record is manipulated with the previous temporary active search record 250 to create a current temporary active search record 250 using a preferred method in 240 described in a later section. If the quality of the current active search record is greater than a threshold in 270, the active search record is matched against an active file record database, subsequently updating the file database as described before in step 280. If the quality of the active search record is lower than that of the card's quality threshold and if the re-enrollment is not allowed, the active search records are sent to 280. If the re-enrollment is allowed, the new search record is recaptured and reprocessed as above procedure.

An active file record of step 280, is a record that is produced from the best quality prints of an identified user from the link list of all the passive file records, that are obtained from past enrollments of the user using the process shown in steps 200 to 280. In contrast the passive search record of step 260 preferably contains the original rolled prints and slap prints of the enrolled fingerprint card. After a search is completed, the passive search record will be added to a link list of passive file records. Thus a passive file record originates from a passive search record which contains the original ten rolled prints and up to 10 slap prints from a search. The active search record of step 250 preferably contains up to ten different individual prints that are selected from the various prints scanned from a single individual. An active file database is created from the active file records enrolled in the system. A list of the file records of a single identified individual is compiled in what is termed a "link list".

In an exemplary embodiment according to the invention, an active search record of step 250 and a passive search record of 260 are created as described. A print obtained from either a live scanner or flat scanner is scanned and captured in step 200 and a quality check algorithm in step 210 is run on the resulting digitized print, preferably using an intelligent card checking system (ICCS) such as the one described in the later section.

A quality check in step 210 provides a predetermined card quality confidence, a specific number of fingers matched between the rolled (or flat) prints and the slap prints on the digitized print and a recommendation of the number of prints to be used in subsequent searches arranged by matched scores from the highest probability of matching prints to the lowest probability. Also determined from the quality check of step 210, is a specific number of prints that may have been entered more than once or duplicated for the same finger for a single individual, and a determination of which finger is so duplicated. As individual fingers may be swapped or rolled over each other to enroll a finger print in the space of another print (e.g., an index print may be incorrectly entered as a ring finger), it is preferable to determine the number of any such swapped fingers of an individual and to identify such prints. Prints are also obtained from individuals that may have had one or more fingers amputated or injured.

If the quality check in step 210 determines that a print is a duplicate, swapped, smudged, etc., such a print is re-enrolled in the system of this invention. In a preferred embodiment, a rolled (or flat) or scanned print may be replaced by a print for the corresponding finger or digit print data that is obtained from the slap prints. By this method a higher quality set of full prints for an individual may be obtained. The resulting quality prints are used to create an active search record. In contrast, a passive search record is created from an original enrolled fingerprint card, i.e. ten rolled prints and ten slap prints and ICCS results. A search case consists of the active search record of step 250 and the passive search record of step 260. The search case is used to match against the filtered file database.

In an exemplary embodiment in which the quality of the obtained prints are determined to be greater than a predetermined threshold and enrollment of the proper fingers in the proper spaces correctly captured has occurred, the determined lower quality obtained prints are replaced by the higher quality slap prints for the corresponding finger prints. The resulting active search record of step 250 thus contains the best quality prints. The passive search record of step 260 contains the original enrolled prints of the individual and the ICCS results. A search case is created for search. The search case containing the active search record of step 250 and the passive search record of step 260 is used to search the active file record database to determine matched results and update the file database in step 280.

In the case of prints that are deemed of a quality lower than the predetermined their quality threshold, print records are corrected by, for example, moving prints back to correct positions, replacing duplicated prints with the correct prints from the slap print, or marking them incorrect, or even fraudulent prints, to be replaced in the re-enrollment process. In so doing, the system of this invention preferably allows the replacement of lower quality roll print data with higher quality slap print data and a temporary enrolled active search record is produced as shown in step 250.

A temporary enrolled active search record, as illustrated in step 250 of FIG. 3, is preferably created and the enrolled temporary passive search record data and the ICCS results are saved together.

In the event the temporary enrolled active search record is deemed to be of a quality lower than the predetermined quality threshold in 270, and if the re-enrollment is allowed; a re-enrollment process is engaged as described above, and a subsequent re-enrollment process may be initiated.

In an exemplary re-enrollment process according to the invention, print data that are of a quality lower than the predetermined threshold may be replaced with the corresponding print data of a quality that is higher than the threshold level. Thus the newly created print record is selected as a temporary re-enrolled active search record as shown in step 250. The re-enrolled data and the ICCS results may be identified as a temporary re-enrolled passive search record as illustrated in step 260. A temporary re-enrolled search record that contains the re-enrolled active search record 250 and the re-enrolled passive search record 260 is created.

In the case of a search record from 235 or 220 that exhibits print data that are of a quality lower than the predetermined threshold, data may be swapped, duplicates replaced, etc., as described above to provide higher quality print records in the 240. The resulting higher quality print data is saved as active search record in 250 as described above.

In a preferred exemplary re-enrollment process of the invention, the quality of each of the finger print data of the re-enrolled active search record is compared with the corresponding finger print data of the previously enrolled active search records, the higher quality finger print records and non marked replacement finger print data are selected as a new enrolled active search record in 240 and a newly enrolled active search record is created 250. Subsequently, the previously temporary active search records in 250 and the temporary re-enrolled search records from 220 are deleted from the system. In addition, the card quality of the re-enrolled passive search record is compared with the card quality of the previously enrolled passive search record. The passive search record with the higher card quality is enrolled into the system as a newly enrolled passive search record. The previously created passive search record may be, and is preferably, deleted.

In the event the current active search record in 250 is deemed to be of a quality lower than the predetermined quality threshold, or if print data from rolled or scanned prints may be replaced by slap print data, a re-enrollment process is engaged as described above and the active search record is saved onto a local disk in 250, and a subsequent re-enrollment process may be initiated.

According to the invention, a preferred embodiment of the matching process employing "1 active search record to N active file records" method is described below.

Preferably, prints in the active search record are selected for matching in an order of decreasing quality. In other words, the higher the quality of the print in the active search record, the sooner the specific print data will be selected for search. When a match is found in the active file record database, the search is finished. The number of fingerprints used in actual search may be significantly smaller than a traditional fixed number of fingerprints search method. For example, if a match is determined between the first selected fingerprint from active search record and the corresponding finger number of the active file record database, no additional fingerprints from the active search record are required for a match search in our current invention system.

More specifically, in the exemplary embodiment of the search method, the fingerprints of an active search record are sorted in descending order of quality. The filtered active file records to be matched are also ordered according to the order the finger number of the active search record. A first print from the active search record is matched with a corresponding print from the file record database using a minutiae matching algorithm. The matched scores are sorted in descending match score order. The sorted match report is sent back to the distributed matcher controller and all finger match reports are evaluated by a decision logic, preferably IDL-1 logic as described in the U.S. Ser. No. 60/415,065 filed Sep. 30, 2002.

If a strong match is declared and the database is updated according to the inventive method as described below.

The match process may then be terminated or the identified top "n" identified matched candidates are submitted to a secondary enhanced expert matching process as described in U.S. Ser. No. 60/415,065 filed Sep. 30, 2002. If the enhanced matching process is used the decision logic algorithm, preferably, IDL-2 logic in U.S. Ser. No. 60/415,065 filed Sep. 30, 2002 is applied.

If a strong matched score is identified from the enhanced matching process, identification is declared and the database is updated as described below.

The enhanced search is thus completed or the identified top "n" identified matched candidates are submitted to a subsequent enhanced expert matching process and a decision logic algorithm, such as IDL-3 logic in U.S. Ser. No. 60/415,065 filed Sep. 30, 2002, is applied and the above described process may be repeated until all of the fingerprints in the active-search record have been selected for the matching process.

Preferably, IDL-3 logic may be used to promote or demote weak hits that are obtained from the previous matching processes using the decision logic IDL-1 and IDL-2 in a sorted order of hits. The candidates, matched scores and order of hits may be provided for inspection, using conventional manual examination, and the database of the system may be updated as described below.

The following describes the creation of an active file record, active file record database and a link list according to an exemplary embodiment of the invention. Specifically, personal data of an individual, such as social security number, address, etc. are captured to form an active search record. The active search record is then compared to active file records in the system and if matched scores are obtained, a verification of the match is determined by comparing the prints of the active search record to those of the active file records. If, however, the verification process does not produce an identification, a search referred to as an "One to N search" is conducted.

In a preferred "One to N search" method, an active search record (step 250) and active file records are loaded into an AFIS system. Print data from the active search record is searched against print data of a corresponding finger on the active file record database using the preferred "1 active search record to N active file records" matching method described above.

In the case in which the verification process returns more than one hit, the identified active file records and the active search record are visually compared by an examiner. If the identified active file records are determined to be false hits, a passive search record corresponding to the active search record is added to a passive file database and the active search record is added to the active file record database. A link list between the active search record and the active file records is generated.

In the event that only one of the identified active file records is a true hit, the link file card records are retrieved and these linked records as reported as hits to the operator or individual. The active file record is updated with the true hit records. If the quality of any fingerprint of the active file record does not meet or exceed the quality of a print for the corresponding finger of the active search record, the lesser quality print data is replaced by the print data of the active search record. The passive search record may be deleted or it may be saved to the passive file record database as desired.

The passive search record may also be added to the passive file record database to become a file record. The file record may be linked to a link list of the identified active file record. In the event more than one of the identified active file records are true hits, link lists of the all identified active file records may be retrieved and these linked records may be reported as hits to the user. The identified active file records may then be reduced to a single active file record. The print data having the highest quality for the same fingerprints may be selected to form as a newly created active file record. The other corresponding prints are preferably deleted. The link lists of the identified true hits may be used to form a consolidated link list to the newly formed active file record. This newly formed active file record may be further updated based on the quality of the active search record, in that a print of poor quality on the active file record may be replaced with the corresponding print of good quality from the active search record.

The passive search record may be deleted or may be saved to the passive file database as desired. If the passive search record is added to the passive file record database as a file record, the resulting file record may be linked to a link list of the identified active file record.

If there are no identified hits resulting from the "One to N search", an examiner may visually compare the finger prints of the active search record with the records containing a descriptive data, such as social security numbers, etc. matched to the descriptive data of file records. If there are no hits found in the visual examination, the passive search card record may be added into the passive file record database and the active search record is added into the active file database. If, however, an active file record is identified as a hit using the decision logic algorithm, the identified active file record and the active search record should be visually compared by an examiner.

An active file record identified as a hit by the examiner is considered a true hit. If the identified active file record is a false hit, the passive search record is added into the passive file database and the active search record is added to the active file record database. A link list between the two records is generated to retrieve the link list file card records and report these linked records from the passive search record database as hits to the operator. As described above, the active file records are updated based on the quality of corresponding to prints in the active search record and the active file records.

The passive search record may be deleted or saved to the passive file record database as desired. If the passive search record is added to the passive file database as a file record, the file record is linked to the link list of the identified active file record.

In the case in which more than one identification is found, the identified active file records and the active search record are visually compared by an examiner. If the identified active file records are false hits, the passive search record is added into the passive file record database and the active search record is added to the active file record database. A link list between the two records is generated, if only one of the identified active file records is a true hit. The linked file records are retrieved and these linked file records may be reported as hits to the user.

The active true hit file record is updated based on the quality of the active search record and the active file record by exchanging poor quality prints for good or high quality prints of the corresponding fingers. The passive search record is deleted or may be saved to the passive file record database according user's desire. If the passive search record is added to the passive file record database to become a file record, the file record is linked to the link list of the identified active file record. If more than one of the identified active records are true hits, the link lists of the identified active file records are retrieved and reported as hits to the operator. The identified active file records are reduced to a single active file record. As described above, a new active file, record is created, unused corresponding prints deleted and the link lists used to form a consolidated link list to the newly formed active file record. This newly formed active file record is also updated by the substitution of better quality prints for poorer quality prints as described above. The passive search record may be deleted or saved to the passive file database.

Since all the duplicate records are saved into the passive file records and only the active file records are used in the matching process, the active file record database is smaller than file record databases in systems that do not employ the present invention. The smaller sized database and the better quality print records of the present invention ensure greater identification of such AFIS systems. Moreover, because of this invention system's smaller database size and the varying number of prints used for each search, identification response times of the invention are greatly reduced and the system exhibits self-healing properties.

In another preferred embodiment of the invention, a fingerprint card scanned on a flatbed scanner or obtained from a live scanner is assigned an identification number. Print data is also captured from an individual or from a previously scanned paper or other media print card by both the rolled method and the slap method. Classification print types and minutiae features are extracted from the captured print data using conventional image processing and an extracting algorithm. The quality of the captured print data is evaluated using a quality algorithm and assigning a quality measurement of 1 to 100. The value 1 is assigned the lowest quality and 100 is the highest quality. The prints are also evaluated for any amputee, duplicate or fraudulent prints by matching the roll print data both against itself and all other rolls using a minutiae matcher. The resulting scores are then preferably organized into a 10x10 matrix according to finger indices from 1 to 10. If any minutiae matcher score on a diagonal of the matrix is less than a score threshold, Tr, and the quality value is less than a quality threshold, Tq, an amputee candidate is found. Tr is preferably chosen to between t1 to t2 depending on which finger is compared, while Tq is chosen to be 10. The threshold values are empirically determined based on the matcher and quality algorithms used. In the system of this invention, t1 is 2800 and t2 is 1800.

To score and quantify a thumbprint, it is preferred to obtain a thumb slap and do a minutiae match against itself. If the score is less than a score having a threshold Tr and the quality is less than Tq, an amputee is confirmed. Here, Tr is chosen to be 2500, else it is not an amputee.

Another method to check for amputated fingers or digits is by reviewing the number of slap prints extracted per hand. If the number of fingers is less than four, and the print for the corresponding missing finger number is missing, amputation is confirmed.

Duplication of prints may be determined by reviewing matched scores obtained on a non-diagonal entry (i, j) of the matrix. If such scores are greater than a score threshold Tdj, the print i and the print j are duplicate fingerprints. For each print compared, the value of Tdj may vary. In this example, Tdj is set to between 3500 and 2500 using a minutiae matcher algorithm. If a score of another entry (I, m) of the matrix is also greater than a score threshold Tdm, the fingerprint I and the fingerprint m are determined to be duplicate prints. If the index i equals the index I or m or if the index j equals index I or m, these prints are determined to be duplicates; that is, these fingerprints are enrolled from the same finger or the prints are enrolled from two different fingers. Using a decision logic algorithm, the duplicate fingerprint indices for each different finger detected are saved into a different finger duplicate cluster. Next, slap prints are matched against the rolled or flat prints using a minutiae match algorithm and an expert matcher algorithm to generate two matrices of scores. If there are no prints missing among the slap prints, the amputation detected and described is determined to be incorrect, and may have been so designated because of a very low quality print that was not enrolled. A missing fingerprint flag is set and the missing index is saved.

To validate and identify the reported duplication according to the invention, the highest minutiae match score (MM) among the scores of each duplicate index of slap prints matched against each duplicate index of roll print is determined. If the highest MM score is greater than a predetermined threshold Tmm, the fingerprints in the finger duplicate cluster are determined to be from the finger index of a slap print which yielded the highest score. A duplicate flag is set and the results checked against the next finger duplicate cluster.

If the MM is less than the predetermined threshold value Tmm, the highest expert matching score (EM) among the scores of each duplicate index of the slap print matched against each duplicate index of roll print is determined. If the EM is greater than a predetermined threshold value Tem, the fingerprints in the finger duplicate cluster are determined to be from the finger index of a slap print that yields the highest score. A duplicate flag is set and checked against the next finger duplicate cluster.

The fingerprint quality of each slap print corresponding to the duplicate fingerprint index number in the cluster is checked using a quality algorithm. If the quality of the slap print is poor, it is determined that the fingerprints in the fingerprint duplicate cluster are from the finger index of this slap. A duplicate flag is set.

If none of the foregoing is determined, there is not enough information in the system to determine which fingerprints have been duplicated. A manual examination is required before proceeding to check the next finger duplicate cluster.

To determine prints that have been swapped or that are out of finger order among the designated finger spaces on the media, according to the invention, check the diagonal MM scores and the symmetric non-diagonal scores. If both diagonal score Smm[i][i] and Smm[j][j] are lower than a predetermined threshold value Tmm and a non-diagonal score Smm[i][j] and its symmetric score Smm[j][i] are both higher than the threshold value Tmm, the fingerprints i and j are determined to be swapped. Set the swap flag and record the swapped index numbers. Go and detect next set of swapped fingerprints.

If, however, both diagonal score Smm[i][i] and Smm[j][j] are lower than a predetermined threshold value and one of Smm[i][j] and Smm[j][i] is higher than a threshold value, and fingerprints i and j are not part of previously detected duplicate fingerprint, check the EM score, which corresponds to the lower score of Smm[i][j] and Smm[j][i].

If the EM score is greater than a threshold value, fingerprints i and j are either swapped and the swap flag is set and the swap index is recorded, or the fingerprints i and j are out of order and the out of order flag is set and the out order indices recorded. The next pair of incorrectly ordered prints may then be reviewed.

If both diagonal scores, Smm[i][i] and Smm[j][j], are lower than a threshold value, both Smm[i][j] and Smm[j][i] are lower than a threshold value, and prints i and j are not part of a previously detected duplicate prints, the EM scores Sem[i][j] and Sem[j][i] are checked. If both EM scores are greater than a threshold value, fingerprints i and j are swapped. Set the swap flag and record the swap index.

If one EM score is greater than a threshold value, the fingerprints i and j are out of order or the quality of the prints is poor. Thus, the order flag is set and the out order indices recorded. It is time to detect the next pair of incorrectly enrolled prints.

If both EM scores are lower than a threshold value, the scores of, all slap prints matched against roll print j are checked.

If a score Sem[k][j] is greater than a threshold, the roll fingerprint j should be placed at position k. Set the out of order flag and record the out order indexes. The next pair of incorrectly enrolled prints is reviewed.

If both diagonal Smm[i][i] and Smm[j][j] are lower than a threshold value and i or j is belongs to a detected duplicate print set, check the next pair of incorrectly enrolled prints.

All detected information is saved as previous referred ICCS results.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, matchable data structures, and the like, which may carry out a variety of functions under the control of one or more microprocessors or other control devices.

Similarly, the software elements of the present invention may be implemented with any programming or scripting language such as, for example, C, C++, Java, COBOL, assembler, PERL, extensible Markup Language (XML), etc., or any programming or scripting language now known or hereafter derived in the art, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

It will be appreciated, that many applications of the present invention could be formulated. One skilled in the art will appreciate that the network may include any system for exchanging data, such as, for example, the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse; kiosk; personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows XP, Windows Whistler, Windows ME, Windows NT, Windows2000, Windows 98, Windows 95, MacOS, OS/2, BeOS, Linux, UNIX, or any operating system now known or hereafter derived by those skilled in the art. Moreover, the invention may be readily implemented with TCP/IP communications protocols, IPX, Appletalk, IP-6, NetBIOS, OSI or any number of existing or future protocols. Moreover, the system contemplates the use, sale and/or distribution of any goods, services or information having similar functionality described herein.

The computing units may be connected with each other via a data communication network. The network may be a public network and assumed to be insecure and open to eavesdroppers. In one exemplary implementation, the network may be embodied as the internet. In this context, the computers may or may not be connected to the Internet at all times. Specific information related to data traffic protocols, standards, and application software utilized in connection with the Internet may be obtained, for example, from DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997): LOSHIN, TCP/IP CLEARLY EXPLAINED (1997). All of these texts are hereby incorporated by Preference. A variety of conventional communications media and protocols may be used for data links, such as, for example, a connection to an Internet Service Provider (ISP) over the local loop as is typically used in connection with standard modem communication, cable modem, Dish networks, ISDN, Digital Subscriber Line (DSL), or various wireless communication methods. Polymorph code systems might also reside within a local area network (LAN) which interfaces to a network via a leased line (T1, T3, etc.). Such communication methods are well known in the art, and are covered in a variety of standard texts. See, e.g., GILBERT HELD, UNDERSTANDING DATA COMMUNICATIONS (1996), hereby incorporated by reference.

As will be appreciated by one of ordinary skill in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example, a telephone network, Intranet; Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (e.g., open language). The term "coupled", as used herein, is defined as connected, although not necessarily directly, and not necessarily mechanically. The term "program" or "set of instructions", as used herein, is defined as a sequence of instructions designed for execution on a microprocessor or computer system. A program or set of instructions may include a subroutine, a function, a procedure, an object method, an object implementation, an executable application, an applet, a servlet, a source code, an object code, a shared library/dynamic load library and/or other sequence of instructions designed for execution of a computer system.

I claim:

1. A method for automated print identification, said method comprising the steps of:
   providing an active search record comprising a plurality of prints;
   arranging the prints of said active search record according to print quality to generate a filtered active file record database comprising a plurality of active file records;
   providing said filtered active file record database as the input to a match algorithm;
   detecting a print correlation corresponding to a print contained in said filtered active file record database;
   determining if a print match has been made;
   determining the strength of a match if a print match has been made;
   determining whether the active search record is to be added into the filtered active file record database; and
   determining whether at least one matched active file record is to be modified; and
   the method further comprising at least one of the steps of:
      detecting missing fingerprints in accordance with at least one of image dynamic range and match score;
      detecting whether a print is at least one of registered in a wrong box or registered in a wrong sequence in accordance with match score;
      detecting whether a print registers as a duplicate in accordance with match score;
      at least one of replacing and substituting a print in accordance with at least one of print quality and match score;
      grading each print in accordance with at least one of print quality and match score between a slap print and a corresponding roll print;
      selecting the best quality prints from an active search record and identified active file records to form said active file record;
      selecting the best quality prints from at least one of slap prints and rolled prints to form said active search record;
      linking an active file record to an identity file records via a link list; and
      compiling an active file record for at least a subset of best quality prints from said link list corresponding to substantially similar identity file records.

2. The method for automated print identification of claim 1, wherein said match algorithm comprises at least one of a coarse matching algorithm and a minutiae match algorithm.

3. The method for automated print identification of claim 2, wherein said step of determining if a print match has been made further comprises comparison of at least one of current and previous print matching scores.

4. The method for automated print identification of claim 1, wherein if the print match indicates a weak hit, the method further comprising the step of presenting a print from the active search record and a matching print from the filtered active file record database to an examiner for verifying the print match.

5. The method for automated print identification of claim 1, further comprising the step of providing at least a plurality of probable candidate print records as input to at least one of a secondary matching algorithm and an expert matching algorithm.

6. The method for automated print identification of claim 5, further comprising the steps of:
   determining if a print match has been made as a result of expert matching results; and
   comparison of at least one of current and previous expert matching scores.

7. The method for automated print identification of claim 6, further comprising the step of indicating to a user that a print match has been made if said strength of said expert match exceeds a predetermined value.

8. The method for automated print identification of claim 1, further comprising the step of iteratively stepping through the plurality of prints in said active search record until at least one of substantially all prints have been searched and an identification is found.

9. The method for automated print identification of claim 8, further comprising the step of at least one of detecting, promoting and demoting at least one of strong and weak hits from said filtered active file record database.

10. The method for automated print identification of claim 9, further comprising the step of detecting more hits due to a link list of matched active file records.

11. The method for automated print identification of claim 3, further comprising the step of determining swapped prints in accordance with said minutiae matching scores.

12. The method for automated print identification of claim 1, wherein said active search record matches an active file record.

13. The method for automated print identification of claim 1, wherein at least one active file record and at least one passive file record yields a link list corresponding to file identification records.

14. The method for automated print identification of claim 1, wherein a record identification event tags an identified active file record for modification and said tagged identified active file record is modified.

15. The method for automated print identification of claim 1, further comprising the step of determining if a print is to be at least one of accepted or rejected from inclusion in the active search record.

16. A system for automated print identification, said system comprising:
   means for providing an active search record comprising a plurality of prints;
   means for arranging the prints of said active search record according to print quality to generate a filtered active file record database comprising a plurality of active file records;
   means for providing said filtered active file record database as the input to a match algorithm;
   means for detecting a print correlation corresponding to a print contained in said filtered active file record database;
   means for determining if a print match has been made;
   means for determining the strength of a match if a print match has been made;
   means for determining whether the active search record is to be added into said filtered active file record database; and
   means for determining whether at least one matched active file record is to be modified; and
   the system further comprising at least one of:
      means for detecting missing fingerprints in accordance with at least one of image dynamic range and match score;
      means for detecting whether a print is at least one of registered in a wrong box or registered in a wrong sequence in accordance with match score;
      means for detecting whether a print registers as a duplicate in accordance with match score;
      means for at least one of replacing and substituting a print in accordance with at least one of print quality and match score;
      means for grading each print in accordance with at least one of print quality and match score between a slap print and a corresponding roll print;
      means for selecting the best quality prints from an active search record and identified active file records to form said active file record;
      means for selecting the best quality prints from at least one of slap prints and rolled prints to form said active search record;
      means for linking an active file record to an identity file records via a link list; and
      means for compiling an active file record for at least a subset of best quality prints from said link list corresponding to substantially similar identity file records.

17. The system for automated print identification of claim 16, wherein said match algorithm comprises at least one of a coarse match algorithm and a minutiae match algorithm.

18. The system for automated print identification of claim 16, further comprising means for providing at least a plurality of probable candidate print records as input to at least one of a second matching algorithm and an expert matching algorithm.

19. The system for automated print identification of claim 18, further comprising:
   means for determining if a print match has been made as a result of expert matching results; and
   means for indicating to a user that a print match has been made if said strength of said expert match exceeds a predetermined value.

20. The system for automated print identification of claim 16, further comprising means for iteratively stepping through the plurality of prints in said active search record until substantially all prints have been searched.

21. The system for automated print identification of claim 20, further comprising:
   means for at least one of promoting and demoting weak hits; and
   means for employing said at least one of promoted and demoted weak hits to update said database.

22. A computer-readable storage element having computer readable code stored thereon for programming a computer to perform a method for automatic print identification, the method comprising the steps of
   providing an active search record comprising a plurality of prints;
   arranging the prints of said active search record according to print quality to generate a filtered active file record database comprising a plurality of active file records;
   providing said filtered active file record database as the input to a match algorithm;
   detecting a print correlation corresponding to a print contained in said filtered active file record database;
   determining if a print match has been made;
   determining the strength of a match if a print match has been made;
   determining whether the active search record is to be added into the filtered active file record database; and
   determining whether at least one matched active file record is to be modified; and
   the method further comprising at least one of the steps of:
      detecting missing fingerprints in accordance with at least one of image dynamic range and match score;
      detecting whether a print is at least one of registered in a wrong box or registered in a wrong sequence in accordance with match score;
      detecting whether a print registers as a duplicate in accordance with match score;
      at least one of replacing and substituting a print in accordance with at least one of print quality and match score;
      grading each print in accordance with at least one of print quality and match score between a slap print and a corresponding roll print;
      selecting the best quality prints from an active search record and identified active file records to form said active file record;
      selecting the best quality prints from at least one of slap prints and rolled prints to form said active search record;
      linking an active file record to an identity file records via a link list; and
      compiling an active file record for at least a subset of best quality prints from said link list corresponding to substantially similar identity file records.

* * * * *